United States Patent Office 2,952,640
Patented Sept. 13, 1960

2,952,640

CESIUM RECOVERY FROM AQUEOUS SOLUTIONS

Charles A. Goodall, Torrance, Calif., assignor to the United States of America as represented by the United States Atomic Energy Commission No Drawing. Filed Nov. 14, 1957, Ser. No. 696,580

14 Claims. (Cl. 252—301.1)

This application deals with the separation or recovery of cesium values in comparatively pure form from aqueous solutions containing said values together with other cation values.

When uranium is bombarded with neutrons of thermal energy, fission products and transuranic elements including plutonium are formed. In processing such neutron-irradiated uranium for the isolation of the plutonium and the uranium, e.g. by extraction or precipitation, aqueous waste solutions are obtained which contain the bulk of the fission products formed during irradiation. One of the fission products present in such aqueous waste solutions is cesium. In a waste solution which had been stored for about six years, for instance, 98 percent of the radioactivity was found to be due to cesium. These waste solutions usually contain comparatively high concentrations of salts the addition of which was necessary for the various processing steps, such as aluminum nitrate, mercury nitrate, sodium dichromate, sodium nitrate, and others and of acids, such as nitric acid; however, they contain the fission product values, including the cesium values, in comparatively very small concentrations.

One of the predominant cesium isotopes present in the above-described type of waste solution is $Cs^{137}$ which is a $\gamma$- and $\beta$-emitter. $Cs^{137}$ represents a source for $\gamma$- and $\beta$-rays of rather constant strength due to its long half-life (37 years). On account of this characteristic, $Cs^{137}$ has been found useful for food and drug sterilization, for the polymerization of organic hydrocarbons, for the production of mobile high-voltage, low-current sources (atomic batteries), for teletherapy and for radiography.

Precipitation of cesium has been carried out heretofore with nickel, cobalt or ferric ferrocyanide, but these processes have the disadvantages that they require the use of large excess quantities of the precipitating agent and furthermore that the precipitates obtained were comparatively voluminous. Another drawback, this in particular when zinc ferrocyanide is the carrying agent, is that solutions from which the cesium is to be recovered usually contain high concentrations of aluminum nitrate, as has been mentioned before, which make the precipitation on the ferrocyanides just listed unsatisfactory; the aluminum nitrate is derived from previous processing steps, for instance, from the step of dissolving the fuel elements and/or from that of solvent extraction wherein aluminum nitrate is often used as a salting-out agent.

It is an object of this invention to provide a process of precipitating cesium values from aqueous solutions for which only a small excess of precipitating agent is required.

It is another object of this invention to provide a process of recovering cesium values from aqueous solutions in the form of a precipitate that has a comparatively small volume so that drying in a small apparatus is possible and small volumes of washing solutions and thus comparatively small underground storage facilities for the wash solutions can be used.

It is still another object of this invention to provide a process of precipitating cesium values from aqueous solutions which results in a precipitate of a small volume and consequently of a high density and high specific activity so that it is usable as a $\gamma$-source.

It is another object of this invention to provide a process of precipitating cesium values from aqueous solutions containing high concentrations of aluminum nitrate.

It is finally also an object of this invention to provide a process of precipitating cesium values from aqueous solutions that have a low pH value.

It has been found that zinc ferricyanide when precipitated in aqueous solutions containing a cesium salt of a mineral acid carries more than 95 percent of the cesium under certain conditions.

The precipitation of zinc ferricyanide is satisfactory only from mineral acid solutions, such as hydrochloric acid and nitric acid, which have an acidity of less than 0.2 N or which are acid-deficient up to 0.61 N. (Acid-deficient solutions are not alkaline solutions. They are solutions in which the excess acid and part of the acidity resulting from hydrolysis of the salts present have been neutralized, for instance, with alkali metal hydroxide. A 0.2 M acid-deficient solution, for instance, is a solution to which alkali metal hydroxide has been added in a quantity sufficient to neutralize all of the excess acid and 0.2 M of the acid derived from hydrolysis of the salt. Acid-deficient solutions are still acid solutions; a 0.2 M acid-deficient nitrate-containing solution, for instance, usually has a pH value of about 1.5 for a solution about 2 M in uranyl nitrate.) At an acidity above 0.2 N the carrying capability of the precipitate for cesium diminishes rapidly, and at acid-deficiencies greater than 0.61 N the aluminum starts to precipitate. The acidity range of from 0.2 N acidity to an acid-deficiency of 0.61 N is therefore critical, the preferred range being from 0 to 0.2 N acid-deficient.

The carrying capability of zinc ferricyanide precipitated in situ is incomparably better than that of a preformed precipitate. The zinc ferricyanide is formed in the solution by adding a water-soluble zinc salt, such as zinc nitrate or zinc chloride, and a water-soluble ferricyanide, such as potassium or ammonium ferricyanide. Two parallel experiments were carried out using identical conditions with the exception that one precipitated the cesium on a preformed zinc ferricyanide, while the other experiment formed the zinc ferricyanide in situ by adding zinc nitrate and potassium ferricyanide in stoichiometric quantities. While with the preformed carrier a decontamination factor of 2 was obtained, the precipitate formed in the solution brought about a recovery corresponding to a decontamination factor of 100. (Decontamination factor is the ratio of amount of cesium in the aqueous solution before precipitation to the cesium amount in the solution after precipitation.)

It is best to use the zinc salt and the potassium ferricyanide in stoichiometric quantities, that is in quantities necessary to form the compound having the formula $Zn_3[Fe(CN)_6]_2$. An excess of potassium or other soluble ferricyanide of up to 50 percent was beneficial as to the carrying of cesium, but a higher excess thereof and any excess of the zinc salt beyond the quantities stoichiometrically required were found to be disadvantageous. This is obvious from precipitations carried out using stoichiometrical quantities, a tenfold excess of potassium ferricyanide and a sevenfold excess of zinc nitrate where cesium decontamination factors of 220, 6.6 and 3.5, respectively, were obtained.

It was also found that there is a lower limit as to the amount or "concentration" of the zinc ferricyanide precipitate in the solution at which cesium is carried; this lower limit is a concentration of 0.0004 M zinc ferricyanide. In a number of samples of 0.3 M nitricacid-deficient solution containing inert cesium in a concentration of 0.0001 M and $Cs^{137}$ in a tracer of concentration various amounts of zinc ferricyanide were precipitated. The cesium decontamination factors obtained were 9.8; 62; 399; and 272 for zinc ferricyanide concentrations in the samples of 0.0008 M; 0.001 M; 0.002 M; and 0.004 M, respectively. It is obvious that under the prevailing conditions a concentration of 0.002 was best.

The process of this invention thus comprises adjusting the acidity of an aqueous solution containing a mineral acid salt of cesium to a mineral acid concentration of from 0.2 N acidity to a 0.61 N acid-deficiency; incorporating a water-soluble zinc salt and a water-soluble ferricyanide in a quantity to obtain a zinc ferricyanide precipitate corresponding to a concentration in the solution of at least 0.0004 M; and separating the cesium-carrying precipitate from the aqueous solution.

The effect of the cesium concentration in the aqueous solution to be treated was examined by precipitating at room temperature a 0.001 M zinc ferricyanide from solutions having different cesium concentrations. Cesium decontamination factors of 203, 303, and 2.1 were obtained from solutions 0.00001 M, 0.0001 M and 0.001 M in cesium, respectively. These data show that good carrying of cesium is accomplished with cesium concentrations of less than 0.001 M and that the intermediate concentration of 0.0001 M yielded the very best results.

As has been mentioned before, the cesium-containing solutions obtained in the processing of fuel elements frequently have a relatively high content of aluminum nitrate. Surprisingly it was found that the aluminum nitrate beneficially affects cesium-carrying on zinc ferricyanide and that improved carrying is obtained within an aluminum nitrate concentration of from 1 to 2.5 M, 1 to 1.6 M giving the very best resutls when a zinc ferricyanide concentration of 0.001 M is used. With less than 0.5 M and with above 2.5 M aluminum nitrate, the cesium removal was rather poor. Waste solutions obtained in the processing of neutron-irradiated fuel elements by solvent extraction usually average an aluminum nitrate concentration of 1.27 M.

Temperatures up 50° C. are satisfactory for the precipitation of the zinc ferricyanide and the cesium thereon, but room temperature was preferred because it simplifies the process and because the precipitate formed then is less soluble. Agitation during precipitation accelerates the reaction. A digestion of about two hours at room temperature (about 25° C.) has been found advantageous for completion of the reaction and better separability of the precipitate. After the two-hour digestion neither an increase of precipitation nor a cesium desorption from the precipitate could be determined.

The precipitate can be separated from the solution by any means known to those skilled in the art, for instance, by centrifuging, filtration or decantation; centrifuging is the preferred method. The separated precipitate is then washed with water in order to remove adhering solution. The washed precipitate can then be either processed for the isolation of the cesium, or else it can be dried at about 110° C. and calcined at between 500 and 600° C. for immediate use as a γ-source.

If the cesium is to be isolated, the washed precipitate is processed without drying and calcining. A great many methods are available for the isolation of cesium, none of which forms part of this invention.

For instance, the precipitate can be dissolved in a cold ammonia solution; the solution obtained is then passed over, or otherwise contacted with, an anion exchange resin whereby the ferricyanide anion is removed. The zinc can then be precipitated from the effluent solution by boiling off the ammonia or else by adding triammonium orthophosphate, leaving the cesium in the supernatant. The cesium can then be recovered from the supernatant as the chloride by adding hydrochloric acid thereto followed by evaporation. Instead of precipitating the zinc, the effluent from the anion exchange resin can also be passed over a cation exchange resin whereby both the cesium and the zinc are adsorbed. The cesium can then be selectively eluted from the resin by means of a limited quantity of water.

Another suitable way of separating the cesium from the zinc contained in the ammoniacal effluent from the anion exchange resin comprises the precipitation of the zinc as the ferrocyanide by the addition of ammonium or potassium ferrocyanide to the solution after its pH value has been adjusted to about 12. A small quantity of the cesium is carried by the zinc ferrocyanide, but a substantially pure cesium ferricyanide solution is left. The cesium can then be converted to the chloride, for instance, by anion exchange on an anion exchange resin in its chloride form.

In the following an example is given to illustrate the improvement obtained by the process of this invention but not to limit the invention to the details given therein.

*Example*

A synthetic waste solution was used that was 1.3 M in aluminum nitrate, 0.3 N acid-deficient as to nitric acid, and contained low concentrations of dichromate, sulfate, ferric, chromic, and uranium ions, tracer concentration of $Cs^{137}$ and an inert cesium in a concentration of 0.0001 M. This solution was made 0.001 M in zinc ferricyanide by adding about stoichiometric amounts of zinc nitrate and potassium ferricyanide. A cake was obtained which, after washing with water and centrifuging for 10 minutes at room temperature, had a volume of 0.4 percent of the solution treated. When from another sample of the same solution the cesium was precipitated on nickel ferrocyanide, a 0.01 M concentration of the precipitate was necessary to obtain the same amount of cesium removal as with the 0.001 M zinc ferricyanide. Apart from this the conditions were the same. The nickel ferrocyanide cake obtained had a volume of 10 percent of the solution treated.

Then another precipitation experiment was carried out using the same solution and the same conditions as just described in connection with the use of zinc ferricyanide as the carrier; but this time three successive precipitations were carried out. As must as 99.999 of the cesium present was removed, which corresponds to a decontamination factor of $10^5$. A total precipitate volume of 1 percent was obtained.

The precipitate obtained using a zinc ferricyanide concentration of about 0.001 M had an activity of 1.05 curies/g. of precipitate. Another precipitate obtained with 0.0008 M zinc ferricyanide showed an activity of 2.2 curies/g. Both activities were determined after washing, drying and igniting.

It will be understood that this invention is susceptible to various modifications and changes and that it is to be limited only by the appended claims.

What is claimed is:

1. A process of removing cesium values from aqueous solutions containing a mineral acid salt of cesium, comprising adjusting the acidity of the solution to from 0.2 N mineral acid to 0.61 N acid-deficiency; adding a water-soluble zinc salt and a water-soluble ferricyanide to the solution in a quantity to obtain a zinc ferricyanide precipitate corresponding to a concentration of at least 0.0004 M; and separating the precipitate carrying said cesium values from the aqueous solution.

2. The process of claim 1 wherein the mineral acid is nitric acid.

3. The process of claim 1 wherein the acidity of the aqueous cesium solution to be treated is adjusted to between 0 N and 0.3 N acid-deficient.

4. The process of claim 1 wherein the temperature of the solution is below 50° C.

5. The process of claim 1 wherein the water-soluble zinc salt is zinc nitrate and the water-soluble ferricyanide is potassium ferricyanide.

6. The process of claim 1 wherein the aqueous solution to be treated contains the cesium salt in a maximum concentration of 0.0001 M.

7. The process of claim 1 wherein the cesium containing-solution to be treated contains aluminum nitrate in a concentration of from 1 to 2.5 M.

8. The process of claim 4 wherein the temperature is room temperature.

9. The process of claim 5 wherein the potassium ferricyanide and the zinc nitrate are added in a ratio of from 2 to 3 moles of the ferricyanide per 3 moles of zinc nitrate.

10. The process of claim 6 wherein the cesium concentration is about 0.0001 M.

11. The process of claim 9 wherein the zinc salt and the ferricyanide are added in quantities to yield a content of zinc ferricyanide of from 0.001 to 0.004 M.

12. The process of claim 11 wherein the content of zinc ferricyanide is about 0.002 M.

13. A process of removing cesium values from an aqueous solution having room temperature and containing cesium nitrate in a maximum concentration of 0.0001 M and aluminum nitrate in a concentration of from 1 to 1.6 M, comprising adjusting the acidity to from 0 to 0.2 M acid-deficiency; incorporating zinc nitrate and potassium ferricyanide in a ratio of 3 moles of zinc nitrate per 2 moles of potassium ferricyanide and in a quantity to yield a concentration of zinc ferricyanide in the solution of about 0.002 M; and separating the zinc ferricyanide precipitate carrying said cesium values from the aqueous solution.

14. A process of removing cesium values from aqueous solutions containing cesium nitrate and aluminum nitrate in a concentration of 1.3 M, comprising adjusting the nitric acid content to a deficiency of 0.3 M; adding zinc nitrate and potassium ferricyanide to said solution in a quantity to obtain a zinc ferricyanide concentration of 0.001 M; and separating the zinc ferricyanide precipitate carrying said cesium values from the aqueous solution.

References Cited in the file of this patent

UNITED STATES PATENTS

| | | |
|---|---|---|
| 2,769,780 | Clifford | Nov. 6, 1956 |
| 2,811,415 | Seaborg | Oct. 29, 1957 |

OTHER REFERENCES

Langford: AEC Document HW–49668, Apr. 15, 1957, 30 pages.